United States Patent [19]
Cicha et al.

[11] Patent Number: 6,054,612
[45] Date of Patent: Apr. 25, 2000

[54] PHOSGENE MANUFACTURING PROCESS

[75] Inventors: Walter V. Cicha; Leo Ernest Manzer, both of Wilmington, Del.

[73] Assignee: E. I. du Pont de Nemours and Company, Wilmington, Del.

[21] Appl. No.: 09/331,076

[22] PCT Filed: Dec. 15, 1997

[86] PCT No.: PCT/US97/22903

§ 371 Date: Jun. 16, 1999

§ 102(e) Date: Jun. 16, 1999

[87] PCT Pub. No.: WO98/28227

PCT Pub. Date: Jul. 1, 1998

Related U.S. Application Data

[60] Provisional application No. 60/033,447, Dec. 20, 1996.

[51] Int. Cl.⁷ .................................................. C07C 51/58
[52] U.S. Cl. ............................................................. 562/847
[58] Field of Search ............................................. 562/847

[56] References Cited

U.S. PATENT DOCUMENTS

| | | |
|---|---|---|
| 4,764,308 | 8/1988 | Sauer et al. . |
| 4,978,649 | 12/1990 | Surovikin et al. . |
| 5,136,113 | 8/1992 | Rao . |

FOREIGN PATENT DOCUMENTS

| | | |
|---|---|---|
| 0 003 530 | 8/1979 | European Pat. Off. . |
| 33 27 274 A1 | 2/1985 | Germany . |
| 55-14044 | 4/1980 | Japan . |
| 6-29129 | 4/1994 | Japan . |
| 2217701 | 11/1989 | United Kingdom . |
| WO 97/30932 | 8/1997 | WIPO . |

OTHER PUBLICATIONS

Fairley, Dupont Recognizes Leaders, Chemical Week, p. 32, Oct. 2, 1996.

Fairley, Flexibility Drives DuPont $CCl_4$ Reductions, Chemical Week, p. 58, Oct. 23, 1996.

Boppart et al., Understanding Activated Carbons, Chemical Processing, pp. 79–82, Sep. 1996.

Derwent Abstract re: JP 06 029 129B, Idemitsu Petrochem KK, Apr. 4, 1994.

Derwent Pub. Ltd., Abstract JP 6029129, Idemitsu Petroleum KK Jan. 10, 1990.

Chemical Abstract No. 65095, p. 673, vol. 94 Dec. 26, 1970.

*Primary Examiner*—Paul J. Killos

[57] ABSTRACT

A process for producing phosgene is disclosed which involves contacting a mixture comprising carbon monoxide and chlorine (e.g., at about 300° C. or less) with carbon which (1) has a micropore to macropore ratio of 3.5 or less; (2) has a high degree of oxidative stability (i.e., loses about 16% of its weight, or less, in the WVC Temperature Test as defined herein); and (3) has a minimum surface area of at least 10 $m^2/g$. The use of this carbon having an active metal content of 1000 ppm or more is disclosed.

6 Claims, No Drawings

PHOSGENE MANUFACTURING PROCESS

This application is the national filing under 35 USC 371 of International Application No. PCT/US97/22903 filed Dec. 15, 1997 and claims benefit of Provisional Application Ser. No. 60/033,447 filed Dec. 20, 1996.

FIELD OF THE INVENTION

This invention relates to a process for the manufacture of phosgene by the reaction of chlorine with carbon monoxide in the presence of a carbon catalyst. More particularly, this invention relates to a process for the manufacture of phosgene with minimal production of the hazardous chemical, carbon tetrachloride.

BACKGROUND

The production of phosgene by the reaction of chlorine with carbon monoxide in the presence of a carbon catalyst is a well known process. The phosgene produced by this process will typically contain 400 to 500 ppm by weight carbon tetrachloride. This amount, evaluated on the basis of the total world-wide production of phosgene of about ten billion pounds ($4.5 \times 10^9$ kg) corresponds to co-production of about 4 to 5 million pounds ($1.8 \times 10^6$ kg to $2.3 \times 10^6$ kg) of carbon tetrachloride with the phosgene.

Japanese patent publication (Kokoku) No. Hei 6[1994]-29129 discloses that the amount of carbon tetrachloride produced during the phosgene manufacturing process can be reduced (e.g., by about 50%) by using an activated carbon which has been washed with an acid and which contains a total of 1.5 wt. % or less of metal components comprised of transition metals, boron, aluminum and silicon.

A process for producing phosgene using carbon having an active metal content of less than 1000 ppm and a weight loss of about 12% or less in the WVC temperature test has been described (see U.S. application Ser. No. 60/012,021 and International Application No. PCT/US96/17526).

Carbon tetrachloride has been of concern in connection with ozone depletion and global warming potentials. Therefore, there is an interest in developing phosgene processes in which the amount of carbon tetrachloride impurity is minimized.

SUMMARY OF THE INVENTION

A process for producing phosgene is provided which comprises contacting a mixture comprising carbon monoxide and chlorine with carbon. In accordance with this invention the carbon (1) has a micropore to macropore ratio of 3.5 or less; (2) loses about 16% of its weight, or less, when sequentially heated in air for the following times and temperatures; 125° C. for 30 minutes, 200° C. for 30 minutes, 300° C. for 30 minutes, 350° C. for 45 minutes, 400° C. for 45 minutes, 450° C. for 45 minutes and finally at 500° C. for 30 minutes; and (3) has a surface area of at least 10 m²/g. Also, in accordance with this invention, the active metal content of the carbon may be 1000 ppm or more. Typically the contact is at a temperature of about 300° C., or less.

DETAILED DESCRIPTION

The present invention relates to improving the production of phosgene produced by contacting carbon monoxide and chlorine with carbon. The improvement can be employed in connection with any of those carbon-based processes used commercially or described in the art (e.g., those processes disclosed in U.S. Pat. Nos. 4,231,959 and 4,764,308).

Phosgene is commercially manufactured by passing carbon monoxide and chlorine over activated carbon. The reaction is strongly exothermic and is usually done in multitubular reactors to more effectively control the reaction temperature. Carbon monoxide is typically added in at least a stoichiometric amount (often in stoichiometric excess) to minimize the free chlorine content of the phosgene product.

As used in connection with this invention, the term "active metals" means metals included in the group consisting of transition metals of groups 3 to 10, boron, aluminum and silicon.

The carbon materials useful as catalysts for this invention are porous (i.e., a surface area of at least 10 m²/g) and contain both micropores and macropores. As used in connection with this invention, the term "micropore" means a pore size of 20 Å (2 nm) or less and the term "macropore" means a pore size of greater than 20 Å (2 nm). The total pore volume and the pore volume distribution can be determined by mercury porosimetry. The micropore volume (cc/g) is subtracted from the total pore volume (cc/g) to determine the macropore volume. The ratio of micropores to macropores is then easily calculated. The carbons used for this process have a micropore to macropore ratio of less than 3.5, preferably 2.0 or less.

The carbons used for the process of this invention also exhibit substantial weight stability when heated in air. More particularly, when heated in air at 125° C. for 30 minutes, followed by heating at 200° C. for 30 minutes, followed by heating at 300° C. for 30 minutes, followed by heating at 350° C. for 45 minutes, followed by heating at 400° C. for 45 minutes, followed by heating at 450° C. for 45 minutes and finally followed by heating at 500° C. for 30 minutes, the carbons employed for the process of this invention lose about 16% of their weight, or less. This sequence of time and temperature conditions for evaluating the effect of heating carbon samples in air is defined herein as the "AVC Temperature Test". The WVC Temperature Test may be run using thermal gravimetric analysis (TGA). Carbons which when subjected to the WVC Temperature Test lose about 16% of their weight, or less, are considered to be advantageously oxidatively stable. Preferably the weight loss in the WVC Temperature Test is 10% or less, more preferably 5% or less.

Low active metal content carbons can be used to achieve low carbon tetrachloride formation (see International Application No. PCT/US96/17526). Low active metal carbons include three dimensional matrix porous carbonaceous materials. For example, the porous carbonaceous materials of Examples C and D in International Application No. PCT/US96/17526 have been measured to have total pore volumes of about 0.58 and 0.90 cc/g, respectively, and micropore to macropore ratios of about zero. Three dimensional matrix porous carbonaceous materials are described in U.S. Pat. No. 4,978.649, which is hereby incorporated by reference herein in its entirety. Of note are three dimensional matrix carbonaceous materials which are obtained by introducing gaseous or vaporous carbon-containing compounds (e.g., hydrocarbons) into a mass of granules of a carbonaceous material (e.g., carbon black); decomposing the carbon-containing compounds to deposit carbon on the surface of the granules; and treating the resulting material with an activator gas comprising steam to provide a porous carbonaceous material. A carbon-carbon composite material is thus formed.

We have, however, discovered that when the above described micropore to macropore ratios and weight stability criteria are satisfied, then the carbon can contain 1000 ppm or greater by weight of active metals. More suprisingly, even the iron content can be greater than 1000 ppm by weight. Iron is known to accelerate carbon tetrachloride formation. Of note are embodiments where active metals are 2000 ppm or more.

Carbon from any of the following sources are useful for the process of this invention; wood, peat, coal, coconut shells, bones, lignite, petroleum-based residues and sugar; provided that they are treated, if necessary, to reduce the micropore volume. Commercially available carbons which may be used in this invention include those sold under the following trademarks: Calgon X-BCP and Calsicat. The carbon support can be in the form of powder, granules, or pellets, or the like.

The carbon surface area as determined by BET measurement is preferably greater than about 100 $m^2/g$ and more preferably greater than about 300 $m^2/g$ (e.g., from 550 to 1000 $m^2/g$). Typically, surface areas are 2000 $m^2/g$ or less.

It is known from dissociation equilibria that at 100° C., phosgene contains about 50 ppm chlorine; and that at 200° C., about 0.4%, at 300° C., about 5% and at 400° C. about 20% of the phosgene is dissociated into carbon monoxide and chlorine. Also, the higher the reaction temperature, the more carbon tetrachloride is generally produced. Accordingly, the temperature of the reaction is generally stable. Preferably the weight loss in the WVC Temperature Test is 10% or less, more preferably 5% or less.

Low active metal content carbons can be used to achieve low carbon tetrachloride formation (see International Application No. PCT/US96/17526). Low active metal carbons include three dimensional matrix porous carbonaceous materials. For example, the porous carbonaceous materials of Examples C and D in International Application No. PCT/US96/17526 have been measured to have total pore volumes of about 0.58 and 0.90 cc/g, respectively, and micropore to macropore ratios of about zero. Three dimensional matrix porous carbonaceous materials are described in U.S. Pat. No. 4,978,649, which is hereby incorporated by reference herein in its entirety. Of note are three dimensional matrix carbonaceous materials which are obtained by introducing gaseous or vaporous carbon-containing compounds (e.g., hydrocarbons) into a mass of granules of a carbonaceous material (e.g., carbon black); decomposing the carbon-containing compounds to deposit carbon on the surface of the granules; and treating the resulting material with an activator gas comprising steam to provide a porous carbonaceous material. A carbon-carbon composite material is thus formed.

We have, however, discovered that when the above described micropore to macropore ratios and weight stability criteria are satisfied, then the carbon can contain 1000 ppm or greater by weight of active metals. More suprisingly, even the iron content can be greater than 1000 ppm by weight. Iron is known to accelerate carbon tetrachloride formation. Of note are embodiments where active metals are 2000 ppm or more.

Carbon from any of the following sources are useful for the process of this invention; wood, peat, coal, coconut shells, bones, lignite, petroleum-based residues and sugar; provided that they are treated, if necessary, to reduce the micropore volume. Commercially available carbons which may be used in this invention include those sold under the following trademarks: Calgon X-BCP and Calsicat. The carbon support can be in the form of powder, granules, or pellets, or the like.

The carbon surface area as determined by BET measurement is preferably greater than about 100 $m^2/g$ and more preferably greater than about 300 $m^2/g$ (e.g., from 550 to 1000 $m^2/g$). Typically, surface areas are 2000 $m^2/g$ or less.

It is known from dissociation equilibria that at 100° C., phosgene contains about 50 ppm chlorine; and that at 200° C., about 0.4%, at 300° C., about 5% and at 400° C. about 20% of the phosgene is dissociated into carbon monoxide and chlorine. Also, the higher the reaction temperature, the more carbon tetrachloride is generally produced. Accordingly, the temperature of the reaction is generally about 300° C., or less (e.g., in the range of from 40° C. to 300° C.). Preferably, the temperature of the process is from about 50° C. to 200° C.; more preferably from about 50° C. to 150° C. The phosgene produced by the process of this invention typically contains about 350 ppm by weight or less of carbon tetrachloride, based upon phosgene (i.e., 350 parts by weight $CCl_4$ per million parts by weight $COCl_2$, or less) even at a temperature of 300° C. Preferably, the reaction temperature and the carbon are chosen to provide phosgene which contains less than about 250 ppm by weight of carbon tetrachloride; and more preferably, are chosen to provide phosgene which contains less than about 100 ppm by weight of carbon tetrachloride, based upon phosgene. Of note are embodiments where the reaction time and temperature are controlled to provide a carbon tetrachloride concentration of about 100 ppm or less based upon the total product stream.

Without further elaboration, it is believed that one skilled in the art can, using the description herein, utilize the present invention to its fullest extent. The following specific embodiments are, therefore, to be construed as merely illustrative, and does not constrain the remainder of the disclosure in any way whatsoever.

EXAMPLES

General Catalyst Testing Procedure

A ½" (12.7 mm) O.D.×15" (381 mm) Inconel™ 600 nickel alloy tube containing a 100 mesh (0.015 mm) Monel™ nickel alloy screen was used as the reactor. The reactor was charged with about 2.5 mL to about 8 mL of carbon catalyst and heated to 300° C. This was the temperature used for all the examples.

A 1:1 molar ratio mixture of carbon monoxide and chlorine was passed over the catalyst. The contact times were between 8 to 12 seconds. The experimental results are shown in Table 1.

The comparative examples were done in the same way as described above. The results are shown in Table A.

General Analytical Procedure

The reactor effluent was sampled on-line with a Hewlett Packard HP 5890 gas chromatograph using a 105 m long, 0.25 mm I.D. column containing Restak™ RTX-1 Crossbond 100% dimethyl polysiloxane. Gas chromatographic conditions were 50° C. for 10 minutes followed by temperature programming to 200° C. at a rate of 15° C./minute. The smallest amount of carbon tetrachloride that could be quantitatively identified by gas chromatography was about 40 ppm by weight. For greater sensitivity an on line mass spectrometer detector was used and calibrated to determine concentrations of less than 40 ppm.

The BET surface area, pore volumes and pore distributions were obtained using a Micromeritics ASAP 2400 instrument.

Thermal Analysis Procedure Thermal gravimetric analysis (TGA) was done using a TA Instruments analyzer. The TGA experiments were done in air at a flow rate of 80 mL/min. The carbon sample was heated in air for the following times and temperatures; 125° C. for 30 minutes, 200° C. for 30 minutes, 300° C. for 30 minutes, 350° C. for 45 minutes, 400° C. for 45 minutes, 450° C. for 45 minutes and finally at 500° C. for 30 minutes. The weight loss was measured at each interval and finally after completion of the heating cycle. The percentage weight loss after completion of the heating cycle at 500° C. is shown in the tables.

Legend

Carbon Sample

A. High surface area coconut shell carbon, Calsicat

B. Partially graphitized carbon, Englehard

C. ¹⁄₁₆" (1.6 mm) graphite carbon, Englehard

D. Type X-BCP proprietary carbon, Calgon Carbon Corp.
R. GRC-11 proprietary carbon, Calgon Carbon Corp.
S. Centaur proprietary carbon, Calgon Carbon Corp.
T. Coconut shell carbon type 507, Barnebey & Sutcliffe Corp.

TABLE 1

| Ex. | Carbon Sample | $CCl_4$ Conc.[1] ppm | TGA Wt. Loss[2] wt. % | Active Metal Content[3] ppm | Fe Content ppm | Surface Area $m^2/g$ | Total Pore Volume cc/g | Micro- Pore Volume cc/g | Micro Macro Pore Ratio |
|---|---|---|---|---|---|---|---|---|---|
| 1 | A | 330 | 15.39 | 2050 | 153 | 1661 | 0.81 | 0.61 | 3.1 |
| 2 | B | <12 | 4.31 | 4580 | 3000 | 836 | 0.44 | 0.26 | 1.4 |
| 3 | C | <8 | 2.18 | 2470 | 1000 | 633 | 0.39 | 0 | 0 |
| 4 | D | 90 | 11.19 | 13,300 | 1900 | 1279 | 0.64 | 0.41 | 1.8 |

[1]By weight as ppm of the $COCl_2$ product. The values shown are averages taken over 7 hours and are high-end estimates
[2]The carbon sample was heated in air for the following times and temperatures: 125° C. for 30 minutes, 200° C. for 30 minutes, 300° C. for 30 minutes, 350° C. for 45 minutes, 400° C. for 45 minutes, 450° C. for 45 minutes and finally at 500° C. for 30 minutes. The wt. loss recorded occurred between 125 and 500° C.
[3]Active metals consist of transition metals of groups 3 to 10, boron, aluminum and silicon

COMPARATIVE EXAMPLES

TABLE A

| Ex. | Carbon Sample | $CCl_4$ Conc.[1] ppm | TGA Wt. Loss[2] wt. % | Active Metal Content[3] ppm | Fe Content ppm | Surface Area $m^2/g$ | Total Pore Volume cc/g | Micro- Pore Volume cc/g | Micro Macro Pore Ratio |
|---|---|---|---|---|---|---|---|---|---|
| A | R | 480 | 88.2 | 1520 | 130 | 835 | 0.40 | 0.36 | 9.0 |
| B | S | 790 | 59.9 | 21,100 | 1900 | 708 | 0.35 | 0.30 | 6.0 |
| C | T | 490 | 89.8 | 4900 | 360 | 1012 | 0.50 | 0.43 | 6.1 |

[1]By weight as ppm of the $COCl_2$ product. The values shown are averages taken over 7 hours and are high-end estimates
[2]The carbon sample was heated in air for the following times and temperatures: 125° C. for 30 minutes, 200° C. for 30 minutes, 300° C. for 30 minutes, 350° C. for 45 minutes, 400° C. for 45 minutes, 450° C. for 45 minutes and finally at 500° C. for 30 minutes. The wt. loss recorded occurred between 125 and 500° C.
[3]Active metals consist of transition metals of groups 3 to 10, boron, aluminum and silicon

What is claimed is:

1. A process for producing phosgene, comprising contacting a mixture comprising carbon monoxide and chlorine with carbon which (1) has a micropore to macropore ratio of 3.5 or less; (2) loses about 16% of its weight, or less, in the WVC Temperature Test; (3) has a surface area of at least 10 $m^2/g$; and (4) has an active metal content of 1000 ppm or more.

2. The process of claim 1 where the contact is at a temperature of about 300° C. or less.

3. The process of claim 2 wherein the active metal content of the carbon is 2000 ppm or more.

4. The process of claim 3 wherein the carbon surface area is greater than about 100 $m^2/g$.

5. The process of claim 4 wherein the micropore to macropore ratio in the carbon is 2.0, or less.

6. The process of claim 5 wherein the carbon loses about 5% of its weight or less in the WVC Temperature Test.

* * * * *